United States Patent
Nyström et al.

(10) Patent No.: US 6,690,203 B2
(45) Date of Patent: Feb. 10, 2004

(54) METHOD AND APPARATUS FOR A FAILURE-FREE SYNCHRONIZER

(75) Inventors: Mika Nyström, Pasadena, CA (US); Rajit Manohar, Ithaca, NY (US); Alain J. Martin, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 115 days.

(21) Appl. No.: 10/033,176

(22) Filed: Dec. 28, 2001

(65) Prior Publication Data

US 2002/0166003 A1 Nov. 7, 2002

Related U.S. Application Data

(60) Provisional application No. 60/259,152, filed on Dec. 29, 2000.

(51) Int. Cl.[7] ............................. H03K 19/00; H03K 5/22
(52) U.S. Cl. ............................. 326/94; 327/22; 327/198; 327/23
(58) Field of Search ............................. 326/94; 327/19, 327/22, 23, 198

(56) References Cited

U.S. PATENT DOCUMENTS 5,489,865 A * 2/1996 Colvin, Sr. ............... 327/198

* cited by examiner

*Primary Examiner*—Daniel Chang
(74) *Attorney, Agent, or Firm*—J. D. Harriman, II, Esq.; Coudert Brothers LLP

(57) ABSTRACT

Unlike prior art synchronizers and asynchronous arbiters that produce glitches in their outputs, the present invention provides a failure-free synchronizer that can sample an arbitrary and unstable inputs while maintaining zero probability of system failure. In particular, the invention addresses the synchronization failure problem and the lack of a metastable state in prior art synchronizers. Prior attempts have shown that the conditions $re \wedge x$ and $re \wedge \neg x$ (where re is the control input and x is the data input) cannot be arbitrated. To overcome this, embodiments of the present invention introduce explicit signals a0 and a1 to hold the values $re \wedge x$ and $re \wedge \neg x$, respectively. One embodiment is a fast synchronizer. It has four main components—an input integrator, an inverting component, a SEL component and an output filter. Another embodiment of the present invention is a safe synchronizer that meets the strictest QDI design requirements. Other embodiments use a standard arbiter and a killable arbiter for arbitration.

23 Claims, 14 Drawing Sheets

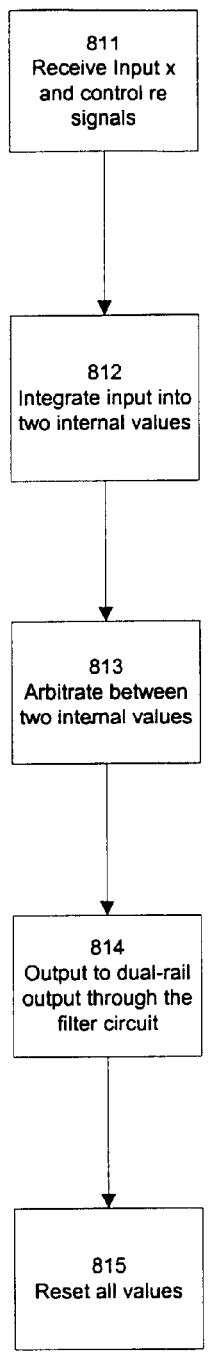
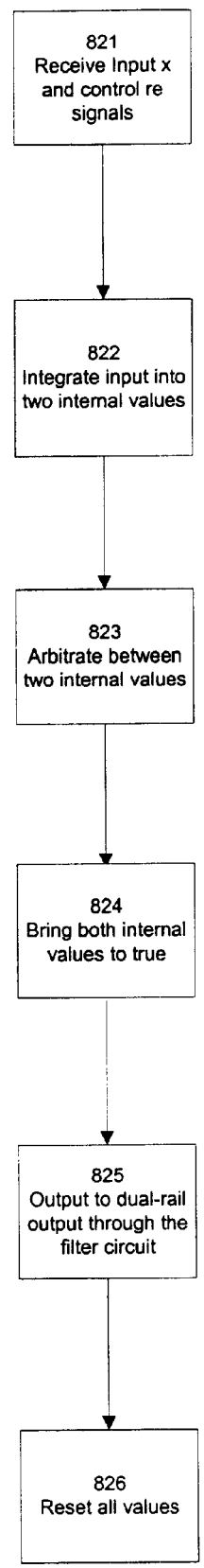
FIGURE 8A
FIGURE 8B

METHOD AND APPARATUS FOR A FAILURE-FREE SYNCHRONIZER

RELATED APPLICATION

The applicant claims priority to provisional patent application No. 60/259,152 filed on Dec. 29, 2000.

The invention was made by an agency of the United States Government or under a contract with an agency of the United States Government. The name of the U.S. Government agency is DARPA and the Government contract numbers DAAH 04-94-G-0274 and F29601-00K-0184.

BACKGROUND OF THE INVENTION

1. Field of the Invention

The present invention relates to logical circuit design, and in particular the invention is directed to a failure-free synchronizer.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Most of today's logical circuit design is synchronous. Synchronous logical circuit design follows an assumption that all components within a system follow a global (system-wide) clock cycle. Events and interactions among various parts can be assumed to happen at discrete time cycles marked by the global clock. Having this assumption can greatly simplify circuit design. As such most of the computers and electronic equipment available today are synchronous.

One area of focus within logical circuit design is building synchronizers. A synchronizer is a circuit that samples a data input. For example, a synchronizer can be used in a computer to detect whether a user has pressed a key on the keyboard. In this case, the data input is the signal that is transmitted from the keyboard to the computer processor when a key is pressed. The synchronizer polls the system bus (a place where the computer receives signals from different components) to see whether a signal from the keyboard has arrived. The polling (sampling) is done at periodic intervals. So in essence the synchronizer is constantly asking "has a key been pressed on the keyboard at this clock cycle?" Other example uses of synchronizers include sampling data that is transferred among parts of a computer (e.g. hard drives) or among different computers across a network.

Synchronization Failure

In the context of synchronous systems that engaged in high-speed communications between independent clock domains, circuit designers found a new class of problems related to using a synchronizer to accept an unsynchronized signal into a clock domain. One of the problems is called synchronization failure. For example, synchronization failure occurs sometimes when a computer system uses a synchronizer to accept signals from external sources that do not follow its own clock cycles. Sometimes the problem occurs within a computer system, where synchronizers are used to synchronize high-speed communication among components that have disparate clock systems.

To better understand synchronization failure, consider again the hypothetical keyboard example (though in real life the keyboard may not be sending high-speed signals that would cause failure). When a user presses a key, the circuit transmits a "1" signal to the synchronizer. At every clock cycle, the computer system also sends periodic control signals of "1" to the synchronizer to notify that it is time to sample. Thus the synchronizer has to watch for two input signals. If the keyboard signal arrives in the interval between two samplings and remains "1" until the synchronizer receives the next "1" from the clock and samples again, then the synchronizer should have no problem recognizing and acknowledging this keyboard signal. If, however, the keyboard signal is withdrawn because the user has let go of the key right before the next clock signal arrives, then there is potential for synchronization failure. In the circuit the withdrawal will be represented by the keyboard signal going from "1" back to "0", which represents no signal. Failure can also occur in the situation when a "0" switches to a "1". Research and practical experiences have shown that the synchronizer may not be able to determine if the switch happens before or after the arrival of the control signal from the system clock. The assumptions of classical physics shows that it is impossible for any device to determine, within a bounded time period, the correct ordering of these two events—the arrival of an unsynchronized switch in input signal and the arrival of a synchronized control signal. However, the device is guaranteed to decide eventually. The state in which the synchronizer is deciding is called the metastable state. If the metastable state lasts a very long time, a failure can occur in a synchronous system. As such, designers of synchronous systems have to accept certain risk of system failure. In many instances, they are able to reduce the occurrence of such risk to an infinitesimally small number by adding latency in circuits that can slow down overall system performance.

Asynchronous Arbiter

Prior art attempts in solving the synchronization failure include using asynchronous arbiters for the purpose of synchronization. An arbiter is a device that determines whether a particular event happened before or after another. The principle behind the asynchronous arbiter is that synchronization failure may be avoided by making the sampling system completely asynchronous. In essence, if no clock demands that the sampling system make its decision after a certain, fixed amount of time, system operation can be suspended until the decision has been resolved. Atypical CMOS arbiter is shown in FIG. 1. This is the commonly implemented R-S latch with a filtering circuit on the output. The arbiter works as follows: if it decides on a (i.e., it determines that a happened first), then output u is asserted. If the arbiter decides on b, then output v is asserted. The two inputs in this case are the unsynchronized input data and the synchronized clock (or control) signal.

In contrast to how this device is used in synchronous circuits, the asynchronous arbiter is allowed to go into a metastable state if the two inputs arrive nearly simultaneously. The filtering circuit on the output (a pass-gate-transformed pair of NOR gate/inverter hybrids) ensures that the arbiter outputs u and v do not change until the internal node voltages are separated by at least a p-transistor threshold voltage—meaning that the internal nodes have left the metastable state. At that time, the arbiter has "made up its mind" and there is no possibility of an output glitch. Although the metastable state in theory can last forever, in practice it is usually a very short period. This is the reason that asynchronous arbiters are attractive—the average delay of the arbiter is likely to be much smaller than the latency that would be required to reduce the probability of synchronization failure to acceptable levels (in a synchronous implementation).

Expressed as a Production Rule Set (PRS), a rule set that acts as the blueprint for circuit building, the simple CMOS arbiter may be written as follows:

$$a \wedge t \mapsto s\downarrow \quad (1)$$
$$b \wedge s \mapsto t\downarrow$$
$$\neg a \wedge \neg t \mapsto s\uparrow$$
$$\neg b \wedge \neg s \mapsto t\uparrow$$

A rule G→s↓ means that the variable s is set to false when the condition G is true. Rules of the form G→s↓ correspond to pull-down chains (meaning that the voltage of the signal s is being pulled down to a level representing false) and G→s↑ correspond to pull-up chains (meaning that the voltage of the signal s is being pulled up to a level representing true). The "∧" symbol represents an "and". For example, in the first rule both a and t have to be true for s to be pulled down. The "¬" symbol represents taking a negation, which is done by taking the opposite value of the variable next to "¬". So the third rule reads: "If the negation of a and the negation of t are both true then s is pulled up." From these production rules the circuit as shown in FIG. 1 is built. This circuit exhibits metastability when both input values a and b are true simultaneously.

A filtering circuit is introduced to prevent the outputs from changing until the arbiter has left the metastable state.

The arbiter is specified by the following handshaking expansion $$*[[a \rightarrow u\uparrow;[\neg a]; u\downarrow \mid b \rightarrow v\uparrow; [\neg b]; v\downarrow]] \quad (2)$$

The series of symbols can be understood as basic guidelines to determine the behavior of the arbiter. The first set of selection bracket "[ . . . ]" encloses another set of selection brackets. Inside, the "|" indicates that the arbiter is to choose one of the two clauses (separated by the "|" to execute. In each clause is a series of commands separated by semicolons. In the first line, the first command checks to see if a is true. If it is, then the output u is set to true. Then comes the selection of the negation of a and the resetting of u to false. The second line performs similar commands based on the value of b. At this stage the arbiter is reset and is ready to receive more input. The "*" symbol outside signifies that this process is performed repeatedly. The overall result is that if arbiter decides on a, then output u is asserted. If the arbiter decides on b, then output v is asserted.

One drawback of the arbiter circuit is that its operation depends on the fact that the inputs are stable, i.e., that the inputs remains asserted until the arbiter has acknowledged the input by making its decision. If one of the requests (inputs) is withdrawn before the arbiter has finally made its decision, the arbiter may fail (one or both of the outputs may glitch). FIG. 2 shows an example of what happens if an unstable input is sampled with a normal arbiter. In this figure, $G_0$ represents the input to the arbiter, a 100 ps pulse, x.r1_ represents the switching internal node (between the R-S latch and the filter latch), and x.x1 represents the output, which glitches. The drawback of the arbiter introduces the design goal of properly handling arbitrary, unstable signals, especially during the metastable state.

Q Modules

Another device that can be used for the purpose of synchronization in an asynchronous environment is called an implementation made up of Q Modules. It has been presented by Rosenberger et al. in the paper "Q-modules: Internally Clocked Delay-Insensitive Modules" (IEEE Transactions on Computers, C37, 9, pp1005–1018, September 1988.) The overall architecture is a delay insensitive interconnection of medium sized sub circuits called Q modules. Each Q module is a standard synchronous like Finite State Machine with edge triggered flip flops, called Q flops, on its input, output and state signals. These special flip-flops use comparator-based circuits to acknowledge when metastability has resolved and values are stable. The acknowledgements from the Q-flops and the state registers are used to generate the next clock event.

QDI Model

Another goal within synchronizer design is to build the circuit so that it can be part of a Quasi Delay-Insensitive (QDI) asynchronous system. By definition, a QDI system is one whose correct operation does not depend on the physical delay of operators (active elements) or wires, which the exception of certain wires called "isochronic forks" that are arranged so as to be fast compared to the circuitry with which they communicate. The assumption that these wires are at least as fast as the circuitry is called the isochronic fork assumption. In practice violations of the isochronic fork assumption can occur in two ways. The first is that an isochronic fork may extend over a large distance, and the signals at the "tines" of the fork are consequently delayed by different amounts. Making the isochronic fork assumption on long wires is generally avoided, although sometimes the extra cost of verifying the assumption is outweighed by a more convenient circuit implementation. The second way that the isochronic fork assumption can be violated is more sinister. In any digital system, the logic threshold of every operator will not be the same as that of every other operator—this is particularly the case if early-threshold gates, due to dynamic circuit implementations, are mixed with combinational logic, as if often true in asynchronous systems. Therefore it must be ensured that the logic transitions on isochronic forks are fast compared to the delay of the gates attached to the outputs of the fork. The subtlety of QDI related issues also presents a challenge in synchronizer design.

Synchronizer Design

There have been attempts at designing a synchronizer that can be used in a asynchronous QDI system. In one attempt, to make the synchronizer QDI compliant, it was designed to produce a dual-rail output with the two rails representing the value of the sample input: either true of false. Each of the output rails encodes a bit and the two bits encode the observed input result as follows: "00"—no data, "01"—0 (input was false), "10"—1 (input was true), and "11"—error. As stated before, a synchronizer has two inputs: a control input and an input signal that is to be sampled. Informally, the specification of this synchronizer is that it waits for the control signal to be asserted and then samples the input. Using handshaking expansions, the program for this synchronizer is given by.

$$*[[re \wedge \neg x \rightarrow r0\uparrow;[\neg re]; r0\downarrow \mid re \wedge x \rightarrow r1\uparrow; [\neg re]; r1\downarrow]] \quad (3)$$

where x is the input being sampled, re is the clocked control input, and the pair (r0, r1) is the dual-rail output. When the system environment (clock) asserts re, the synchronizer springs into action and samples x, returning the observed value by asserting either r0 (x was false) or r1 (x was true).

What makes the implementation of this circuit challenging is that x may change from true to false and vice versa at anytime. Sometimes this happens when an input request signal is first asserted and then withdrawn. If the input has a stable true value within a finite, bounded interval around the time control input arrives, the circuit asserts r1; if the input is a stable false, the circuit asserts r0. Otherwise if the input value is not stable in this time period, the circuit asserts either r0 or r1, but not both. In practice, this finite bounded time interval (or "confusion interval") will be a very short time indeed, approximately the delay of the single inverter used to invert the input. The confusion interval is analogous to the setup and hold times of a latch. However, as opposed to a latch, the synchronizer is required to operate correctly (albeit non-deterministically) even if the input changes in this interval. In fact, the specification allows the input to be an arbitrarily narrow pulse, among other disconcerting signals. All that is really required of the input is that it be within the range of safe device operation to prevent the circuit from being damaged. Thus, the synchronizer design cannot safely assume a stable input even within the very short "confusion interval."

The fact that prior art synchronizer designs cannot handle a request that can be withdrawn at anytime has real life implications. This is because sometimes the ability to handle a withdrawn request is part of a system specification. The MIPS computer system ISA bus, for example, allows an external interrupt request to be withdrawn at anytime.

A Synchronizer Implementation

Based on the aforementioned synchronizer design, a synchronizer was implemented to solve the synchronization failure problem. The Production Rule Set (PRS) for the synchronizer is as follows:

$$x \mapsto x\_\downarrow \quad (4)$$

$$\neg x \mapsto x\_\uparrow$$

$$x \wedge re \wedge t \mapsto s\downarrow$$

$$x\_ \wedge re \wedge s \mapsto t\downarrow$$

$$\neg re \wedge \neg t \mapsto s\uparrow$$

$$\neg re \wedge \neg s \mapsto t\uparrow$$

Unfortunately, this implementation was shown to be incorrect. Although the PRS shows that the implementation produces no illegal result, it is incorrect because it lacks a metastable state. In scenarios in which x changes close to the time when the sampling request on re arrives, the synchronizer must enter a metastable state (like the arbiter presented earlier). Otherwise it would be a bounded-delay synchronizer, contradicting the fact that it is impossible for a synchronizer to determine the order of two events within a bounded time period. The reason it does not have a metastable state can be understood by looking at the production rules. In the situation when x=false and re=true, the PRS (4) can be simplified to:

$$s \mapsto t\downarrow \quad (5)$$

$$\neg t \mapsto s\uparrow$$

$$\neg s \mapsto t\uparrow$$

The only stable state for this PRS is s=true, t=false, which is the desired outcome when x is false. However, if the device has only one stable state, then by calculus it cannot have a metastable state. To see how this is true, the metastable state can be considered as the peak of a hill. On both sides of the peak are valleys, symbolizing the stable states. The operation of a circuit in a metastable state is like a ball on the peak of the hill. The ball will eventually roll off of the peak into one of the valleys where it remains. This is analogous to the synchronizer having decided between one of two possible options. Since there are two valleys representing the two possible outcomes, it is impossible to have a metastable state with only one stable state. Without the metastable state, this circuit cannot possibly be a correct synchronizer.

It seems contradictory that even the production rules prevent the synchronizer from producing an illegal result, it is still shown to be incorrect. The only way to reconcile these facts is that the device enters a deadlocked state under some circumstances. To see how this may happen, consider the case that x is true when re is asserted—s will begin to fall (rule 3 of PRS). If x changes to false before s has fallen all the way, then t will begin to fall (rule 4 of PRS). If s has fallen far enough before this happens, then the device may get stuck in a state in which both s and t are in the intermediate range between a legal logic zero and legal logic one. Once this happens there is no rule in the PRS that will lead the circuit to another state. Thus it ends up in a deadlocked state.

Overall the challenge in synchronizer design is to solve the synchronization failure problem. Further it includes designing a QDI-compliant synchronizer that can handle arbitrary, unstable input signals correctly, especially during the metastable state. Finally, from observing prior art attempts, a correct design must have a metastable state.

SUMMARY OF THE INVENTION

The present invention provides a failure-free synchronizer. Unlike prior art synchronizers and asynchronous arbiters that produce glitches in their outputs, the present invention can sample an arbitrary and unstable inputs while maintaining zero probability of system failure.

In particular, embodiments of the invention address the synchronization failure problem and the lack of a metastable state in prior art synchronizers. The defects in prior art attempts have shown that the conditions $re \wedge x$ and $re \wedge \neg x$ (where re is the control input and x is the data input) cannot be arbitrated. To overcome this problem, embodiments of the present invention introduce explicit signals a0 and a1 to hold the values $re \wedge x$ and $re \wedge \neg x$, respectively.

One embodiment of the present invention is a fast synchronizer. It has four main components—an input integrator, an inverting component, a SEL component and an output filter. The SEL component does the arbitration and is designed to operate with a metastable state. Since the fast synchronizer in some circumstances may not conform to the isochronic fork assumption, another embodiment is a safe synchronizer that fully meets the strictest QDI design requirements. The fork assumption is preserved as follows. Once the SEL component decides, the other input value (losing value) is also brought high to prevent a possible glitch due to an intermediate voltage value being interpreted as false by some components and true by others.

One embodiment of the present invention is a safe synchronizer that has uses a standard arbiter. In this embodiment, the values of a0 and a1 are reset in an order that allows the usage of a standard arbiter, which is desirable in keeping the number of "black boxes" verification to a minimum. Another embodiment is a synchronizer with a "kilable" arbiter. The synchronizer in this embodiment disables the arbiter at appropriate times to simplify design and ensure correct operation.

BRIEF DESCRIPTION OF THE DRAWINGS

These and other features, aspects and advantages of the present invention will become better understood with regard to the following description, appended claims and accompanying drawings where:

FIG. 8A shows the operation of one embodiment of the present invention.

FIG. 8B shows the operation of one embodiment of the present invention.

DETAILED DESCRIPTION OF THE INVENTION

The present invention is failure-free synchronizer and methods of producing such a synchronizer. Embodiments of the present invention can sample arbitrary and unstable input signals while maintaining a zero probability of system failure. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

A long-standing goal in synchronizer design is to create a synchronizer that can sample an arbitrary and unstable digital signal. Such a signal has a value that may change at any time without waiting for an acknowledgement from the circuit. Until now no satisfactory implementation of a synchronizer has been found to accommodate this class of arbitrary and unstable signals. Prior art asynchronous arbiters failed when signals became unstable during the metastable state. Another goal in synchronizer design is to build synchronizers that can be used in QDI asynchronous circuit. A prior art implementation achieved QDI-compliance but unfortunately was shown to lack a metastable state and hence incorrect.

Fast Synchronizer

Embodiments of the invention address the synchronization failure problem and the lack of a metastable state in prior art synchronizers. It is known that the function of prior art synchronizers is given by the following handshaking expansion:

$$SYNC \equiv {}^*[[re \wedge x \to r0\uparrow;[\neg re]; r0\downarrow \mid re \wedge \neg x \to r1\uparrow; \qquad (6)$$

$$[\neg re]; r1\downarrow]]$$

whose environment is described by $$ENV \equiv {}^*[re\uparrow;[r0 \vee r1];re\downarrow;[\neg r0 \wedge r1]]. \qquad (7)$$

The defects in prior art attempts has shown that the conditions $re \wedge x$ and $re \wedge \neg x$ cannot be arbitrated. To overcome this problem, embodiments of the present invention introduce explicit signals a0 and a1 to hold the values $re \wedge x$ and $re \wedge \neg x$, respectively. This yields the handshake expansion:

$$SYNC\_CORRECT \equiv {}^*[[re \wedge \neg x \to a0\uparrow;[a0]; r0\uparrow; [\neg re]; a0\downarrow; \qquad (8)$$

$$[\neg a0]; r0\downarrow \mid re \wedge x \to a1\uparrow; [a1]; r1\uparrow; [\neg re]; a1\downarrow; [\neg a1]; r1\downarrow]]$$

Note that the progression of the circuits now has a0 and a1, which are added to hold the values of $re \wedge x$ and $re \wedge \neg x$, respectively.

Figure 1:
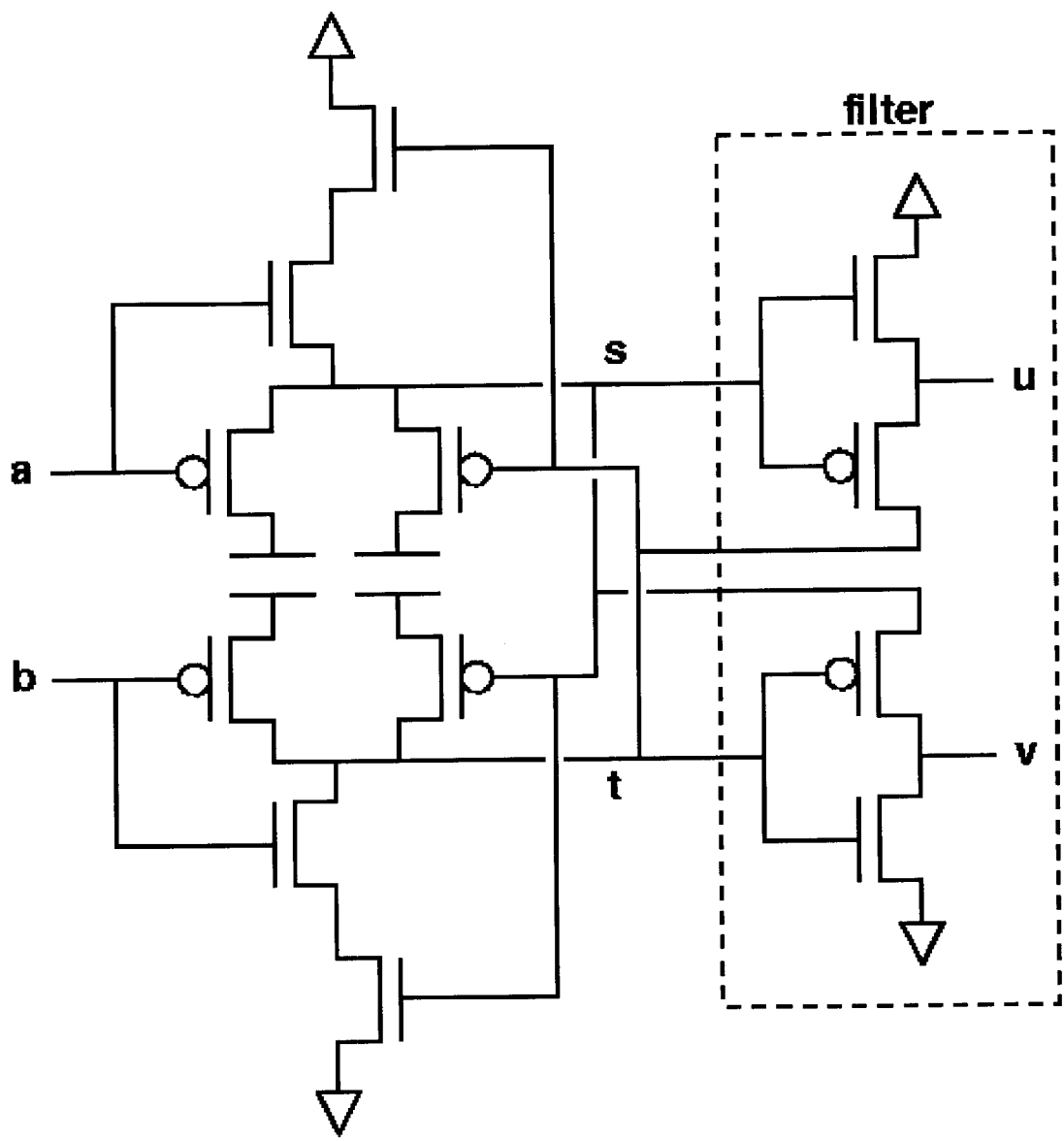
FIG. 1 is a "Mead and Conway" CMOS arbiter.
Figure 2:
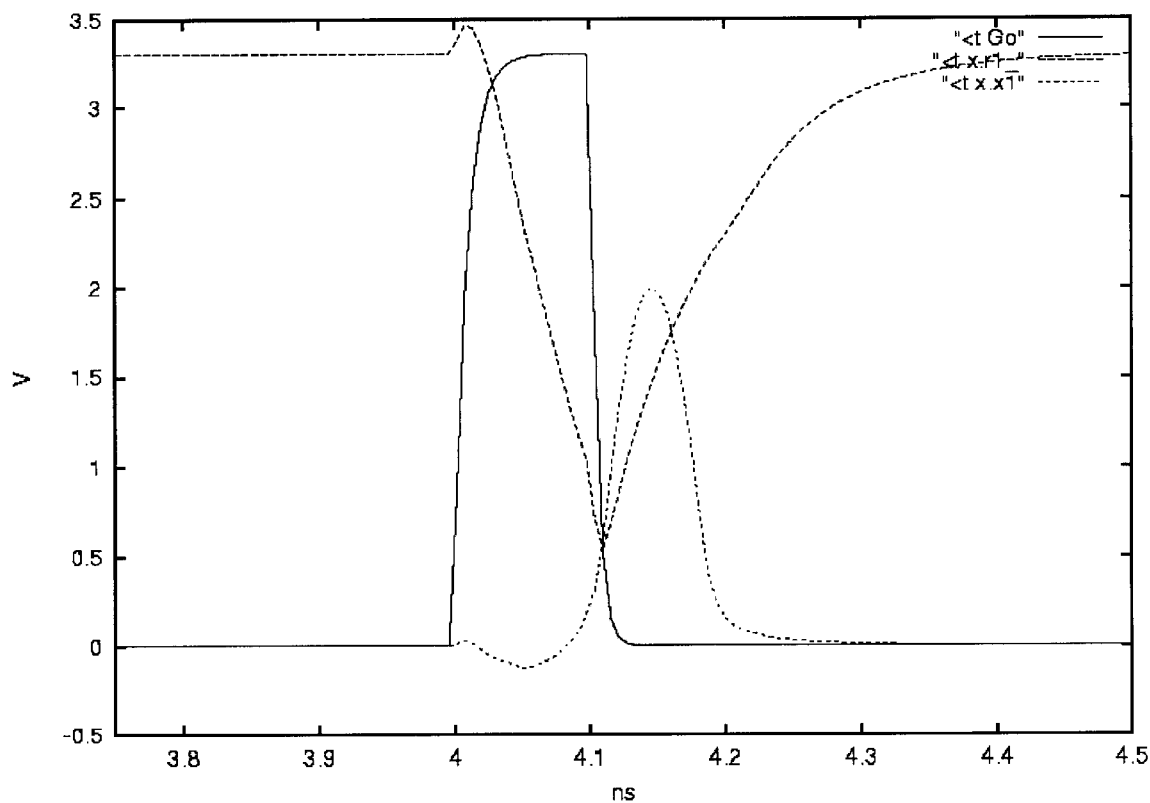
FIG. 2 is a diagram showing the waveforms of a misbehaving arbiter.
Figure 3:
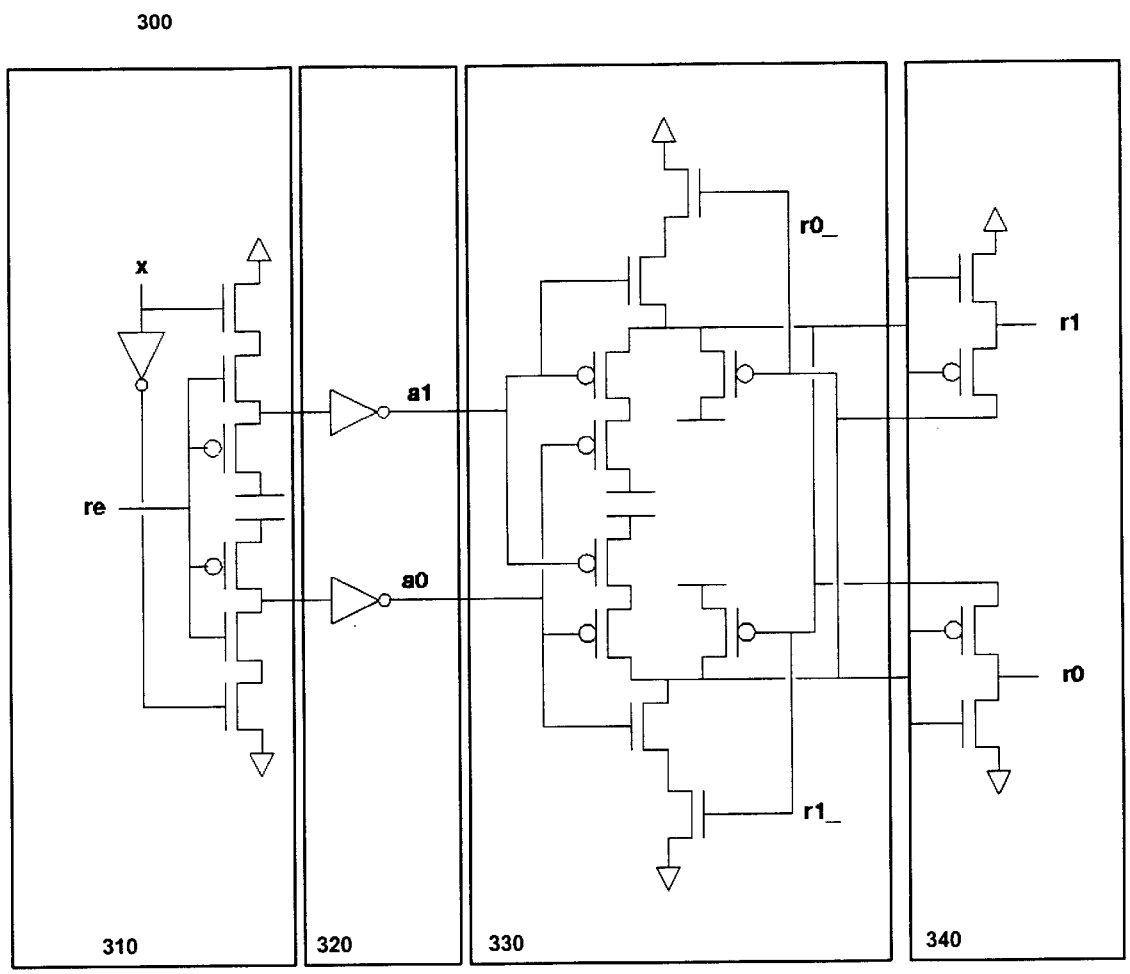
FIG. 3 is a circuit diagram of a synchronizer according to one embodiment of the present invention.

FIG. 3 shows a circuit diagram of a fast synchronizer according to an embodiment of the present invention. Synchronizer 300 has four main components—an input integrator 310, an inverting component 320, a SEL component 330 and an output filter 340. The components are described in further details below.

Based on the handshake expansion of SYNC_CORRECT, a handshake expansion (HSE) of this embodiment is obtained:

$$SYNC\_NEW \equiv {}^*[[re \wedge \neg x \to a0\uparrow;[\neg re]; a0\downarrow \mid re \wedge x \to a1\uparrow; \qquad (9)$$

$$[\neg re]; a1\downarrow]]$$

$$SEL \equiv {}^*[[a0 \to r0\uparrow;[\neg a0 \wedge \neg a1]; r0\downarrow \mid a1 \to r1\uparrow;$$

$$[\neg a1 \wedge \neg a0]; r1\downarrow]]$$

This HSE describes the functionality of several components of the embodiment. Input integrator 310 and inverting component 320 are described by SYNC_NEW and SEL component 330 is described by SEL. Together their functionality is similar to that of SYNC_CORRECT but with a slightly different setup, specifically:

$$SYNC\_CORRECT \equiv SYNC\_NEW \square SEL \qquad (10)$$

The bar "∥" means that SYNC_NEW and SEL run in parallel. Input integrator 310 "stores" the values of $re \wedge \neg x$ and $re \wedge x$ into a0 and a1. The outputs of input integrator 310 are a0 and a1. Then they are fed through inverting component 320 to SEL component 330. SEL component 330 takes inputs a0 and a1 to give output values to r0 and r1.

As stated before, to correct the lack of metastability error in prior art implementations, embodiments of the present invention need to arbitrate between a0 and a1 instead of between $re \wedge \neg x$ and $re \wedge x$. Thus instead of implementing SYNC_NEW as written, the follow production rules are used in one embodiment to permit the different parts of SYNC_NEW to execute concurrently. Since specifying the circuit behavior as a handshaking expansion is cumbersome, the production rules for input integrator 310 and inverting component 320 are listed here instead:

$$re \wedge \neg x \mapsto a0 \uparrow \quad (11)$$

$$\neg re \mapsto a0 \downarrow$$

$$e \wedge x \mapsto a1 \uparrow$$

$$r \neg re \mapsto a1 \downarrow$$

To make the rules CMOS-implementable, an inverter is introduced to generate x_ in the first production rule.

Given that these rules all execute concurrently, SEL component 330 operates as follows. Signals a0 and a1 are independent from each other, in the sense that they can be both true at the same time if x is sampled during the confusion interval. Also because x can be sampled during a transition, the transitions a0 ↑ and a1 ↑ are not always completed, but it is assumed that at least one of them completes eventually. The circuit considerations that enable this assumption are discussed later in the next section.

SEL component 330 is similar to but not identical to an arbiter. In an arbiter, when both inputs are high, the arbiter selects both inputs one after the other in arbitrary order since a request is never withdrawn. In SEL component 330, when both inputs are high, only one should be selected. Hence the condition that both a0 and a1 are false must be checked before resetting the output of SEL component 330. SEL is again listed for reference.

$$SEL \equiv \ ^*[[a0 \rightarrow r0\uparrow;[\neg a0 \wedge \neg a1]; r0\downarrow; \ | \ a1 \rightarrow r1\uparrow; \quad (12)$$

$$[\neg a1 \wedge \neg a0]; r1\downarrow;]]$$

Note the bold type highlighting that both a0 and a1 are checked for falseness. Also the "|" bar indicates that the selection between a0 and a1 is non-deterministic. Thus embodiments of the present inventor, unlike prior art arbiters, do not require the inputs to be stable. The input can be withdrawn. In one embodiment, SEL can be implemented directly as a bistable device, and the production rules for SEL component 330 are:

$$r1\_ \wedge a0 \mapsto r0\_\downarrow \quad (13)$$

$$\neg r1\_ \vee (\neg a0 \wedge \neg a1) \mapsto r0\_\uparrow$$

$$r0\_ \wedge a1 \mapsto r1\_\downarrow$$

$$\neg r0\_ \vee (\neg a1 \wedge \neg a0) \mapsto r1\_\uparrow$$

Implementing both PRS (12) and (13) yields most of the circuitry as shown in FIG. 3. A final component, output filter 340, is added to necessary to block the metastable state from reaching the digital outside world.

Synchronizer Properties

It can shown that embodiments of the present invention do not have the same lack of metastability problem found in prior art synchronizers. The proof is as follows. Consider the case when both a0 and a1 are true in the synchronizer outlined in the last section, the PRS (13) then reduces to:

$$r1\_ \mapsto r0\_\downarrow \quad (14)$$

$$\neg r1\_ \mapsto r0\_\uparrow$$

$$r0\_ \mapsto r1\_\downarrow$$

$$\neg r0\_ \mapsto r1\_\uparrow$$

At the circuitry level, these rules translate to a pair of cross-coupled inverters, a bistable device that exhibits metastability. Therefore, embodiments of the present invention do not have the same problem found in prior art attempts.

Besides overcoming the lack of metastability, embodiments of the present invention also have the advantage of not needing staticizers. Checking whether staticizers are needed is an important consideration in building embodiments of the present invention. Specifically, the pullup/pulldown pairs for r0_ and r1_ need to be checked to see if they have to be staticized. Briefly, the check is performed as follows. Referring to PRS (13) and starting in the initial state, r0_ is pulled down by r1_∧a0; r0_ can be left floating in the state r1_∧¬a0∧a1. But in this state¬re holds, and therefore the transition a1 ↓ is enabled. Hence the floating state does not persist, and staticizers are not needed.

Another important property of the present invention is that, unlike prior art arbiters, it can handle unstable input. By introducing a0 and a1, embodiments of the present invention are allowed to have unstable input. The input x does not have to be stable. It can oscillate arbitrarily and transitioning more than once. Even if this happens the condition that a0 and a1 be pulled up monotonically still holds.

While analysis shows that SEL component 320 in the embodiment outlined before overcomes the lack of metastability problem in incorrect prior art synchronizers, SEL does not fully meet the strictest requirement of QDI design style in its reset process. To illustrate this, consider when the output r0 is asserted. This means that the input a0 must have been asserted at some time in the past. However, the voltage of a1 when r0 is observed to go high is unknown. It cannot be observed if a1 is, perhaps, in the middle of the voltage range—it could be at a voltage low enough to allow r0 to reset, yet high enough to allow r1 to become active later—which might allow a glitch to appear on the r1 output. However, this situation only arises if the resetting of a1 by the p-transistor gated by re is slow. If the implementation can ensure that this is never the case, this situation can be safely ignored. However, the present invention does provide another embodiment that is fully QDI-compliant.

Safe Synchronizer

To address the aforementioned situation in the SEL component and ensure full QDI compliance, another embodiment of the present invention yields a safe synchronizer. The modification made here is to ensure both a0 and a1 are at a well-defined value, true, before resetting the circuit. The values re∧x and re∧¬x are sampled as before and SEL component is used to determine which of r0 or r1 should be asserted.

Figure 4:
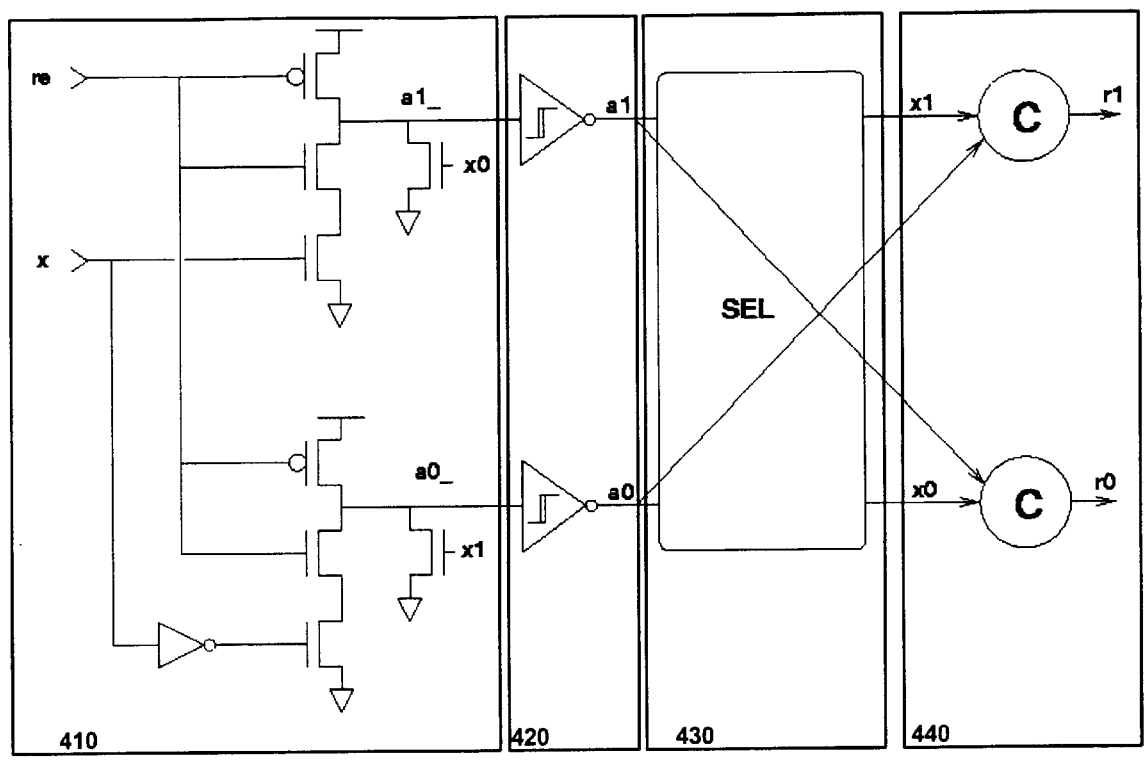
FIG. 4 is a circuit diagram of a safe synchronizer according to one embodiment of the present invention.

FIG. 4 shows the circuit diagram for the safe synchronizer. As with the fast synchronizer, it has four components—input integrator 410, inverting component 420, SEL component 430, and output filter 440. The safe synchronizer works as follows. Once the SEL process has decided which input is high, the other input is brought high. Once all inputs are in a known digital state (i.e. legal 0 and 1 values), the circuit resets. This design isolates the state in which a0 and a1 can have intermediate voltage value, allowing the analysis to be performed in the digital domain.

The digital analysis is sound as long as the inputs to the arbiter are monotonically increasing. Once SEL component 430 has decided that one of the inputs has become high, it will not "change its mind." If the input x changes while re is high, both a0 and a1 may rise, and SEL component 430, like an arbiter, picks non-deterministically. To apply the new approach, two new variables x0 and x1 are introduced. The behavior of the overall circuit in this safe embodiment is:

$$*[[re \wedge \neg x \to a0\uparrow; x0\uparrow; a1\uparrow; r0\uparrow; \quad (15)$$
$$[\neg re]; a0\downarrow; a1\downarrow; x0\downarrow; r0\downarrow \mid re \wedge x \to a1\uparrow;$$
$$x1\uparrow; a0\uparrow; r1\uparrow; [\neg re]; a0\downarrow; a1\downarrow; x1\downarrow; r1\downarrow]].$$

In this embodiment, SEL component 430 drives x0 and x1 instead of the output directly, as follows:

$$SEL \equiv *[[a0 \to x0\uparrow; [\neg a0 \wedge \neg a1]; x0\downarrow \mid a1 \to x1\uparrow; \quad (16)$$
$$[\neg a1 \wedge \neg a0]; x1\downarrow]].$$

The rest of the synchronizer comprises of the input integrator 410, inverting component 420 and output filter 440, which are compiled as follows. First, output filter 440 is simply compiled as a pair of C-elements, described by PRS (17):

$$x0 \wedge a1 \mapsto r0\uparrow \quad (17)$$
$$\neg x0 \wedge a1 \mapsto r0\downarrow$$
$$x1 \wedge a0 \mapsto r1\uparrow$$
$$\neg x1 \wedge \neg a0 \mapsto r1\downarrow$$

The functionality of input integrator 410 and inverting component 420 are described the following PRS, which is the same as the PRS for corresponding parts in the fast synchronizer embodiment:

$$re \wedge \neg x \vee x1 \mapsto a0\uparrow \quad (18)$$
$$\neg re \mapsto a0\downarrow$$
$$re \wedge x \vee x0 \mapsto a1\uparrow$$
$$\neg re \mapsto a1\downarrow$$

In the CMOS realization the rules are as follows $$re \wedge \neg x \vee x1 \mapsto a0\_\downarrow \quad (19)$$
$$\neg re \mapsto a0\_\uparrow$$
$$re \wedge x \vee x0 \mapsto a1\_\downarrow$$
$$\neg re \mapsto a1\_\uparrow$$
$$a0\_ \mapsto a0\downarrow$$
$$\neg a0\_ \mapsto a0\uparrow$$
$$a1\_ \mapsto a1\downarrow$$
$$\neg a1\_ \mapsto a1\uparrow$$

In another embodiment, the CMOS production rules for a0 and a1 are implemented as Schmitt triggers instead of inverters in inverting component 420. This is to guarantee that a0 and a1 will switch quickly and cleanly between the rails without glitches. The reason for the Schmitt triggers is as follows. In embodiments that use inverters the signals are already guaranteed to be monotonic. However, if a signal is changing monotonically but slowly, it is possible that a single value is interpreted as both a zero and a one logic value by different parts of a circuit. This is, in essence, due to the presence of isochronic forks where the transistors located at the tines of the fork have different voltage thresholds, a subtle violation of the QDI model discussed in the background section. The Schmitt trigger is a "slew rate amplifier." By using (inverting) Schmitt triggers, the synchronizer in this embodiment can take advantage of the property that an input that changes monotonically from one voltage rail to another generates an output that changes monotonically between the rails, but always fast enough to satisfy the isochronic fork assumption. Thus, the isochronic fork violation can be avoided. Another enhancement that Schmitt triggers provide is that they add a satisfying noise margin to the design due to its hysteresis. The cost of using Schmitt triggers is the introduction of late, hysteretic thresholds into the circuit and thus longer latency.

Using a Standard Arbiter in the Safe Synchronizer

Another embodiment of the present invention replaces the SEL component in the safe synchronizer with a standard arbiter. The motivation for this replacement is that sometimes, for simplicity, it is desirable to minimize the number of "black boxes" (especially those containing metastability) that need to be verified. The arbiter can safely replace the SEL component providing that a0 and a1 reset in the correct order.

Figure 5:
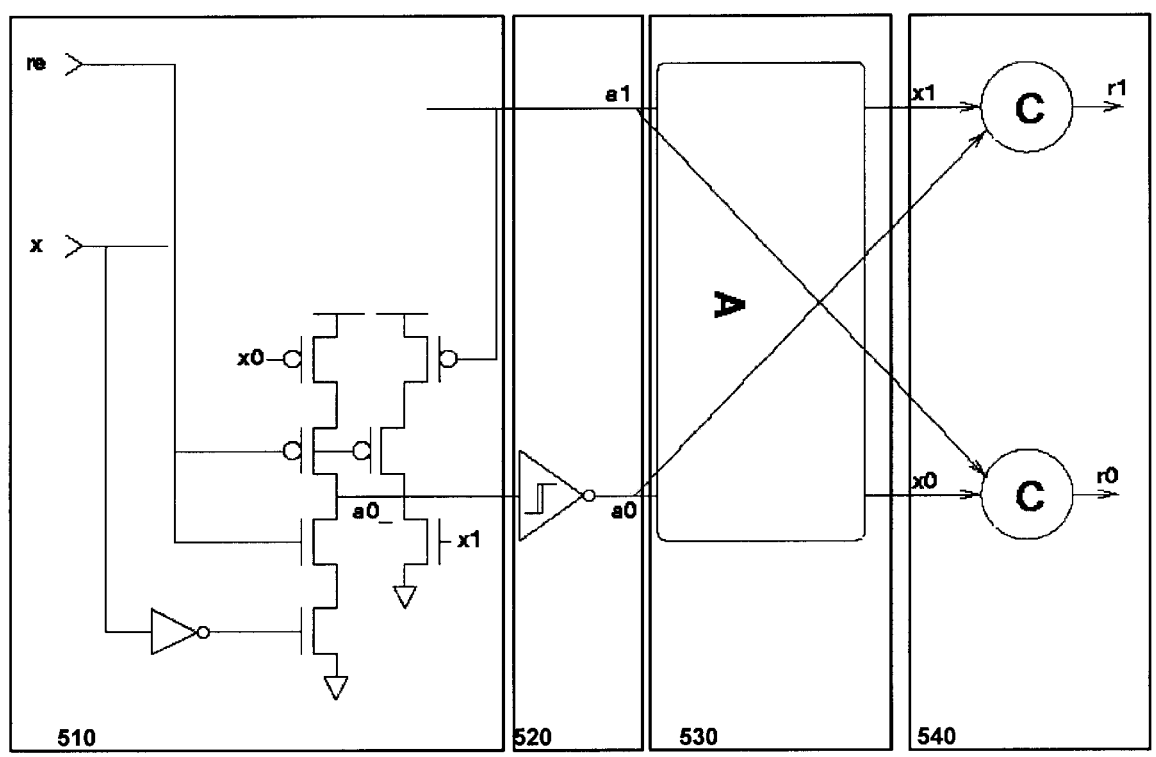
FIG. 5 is a partial circuit diagram of a synchronizer with a standard arbiter according to one embodiment of the present invention.

A partial circuit diagram of the embodiment is shown in FIG. 5. It has four components—input integrator 510, inverting component 520, standard arbiter 530, and output filter 540. The circuitry details of the standard arbiter are not shown. Both input integrator 510 and inverting component 520 are different from the safe synchronizer embodiment in FIG. 4 to accommodate the use of standard arbiter 530.

In this embodiment with the standard arbiter, the overall program of the circuit is as follows:

$$*[[re \wedge \neg x \to a0\uparrow; x0\uparrow; a1\uparrow; r0\uparrow; [\neg re]; a1\downarrow; a0\downarrow; x0\downarrow; \quad (20)$$
$$r0\downarrow \mid re \wedge x \to a1\uparrow; x1\uparrow; a0\uparrow; r1\uparrow; [\neg re]; a0\downarrow; a1\downarrow; x1\downarrow; r1\downarrow]];$$

the only difference between this program and that in the safe synchronizer embodiment is the sequencing of the down-going actions on a0 and a1 (highlighted in bold). By withdrawing the losing request before the winner, a standard arbiter can be used without introducing any glitches. To accomplish this, the PRS of integrator component 510 and inverting component 520 is modified in this embodiment to:

$$re \wedge x\_ \vee x1 \mapsto a0\_\downarrow \quad (21)$$
$$\neg re \wedge \neg a1 \mapsto a0\_\uparrow$$
$$re \wedge x \vee x0 \mapsto a1\_\downarrow$$
$$\neg re \wedge \neg a0 \mapsto a1\_\uparrow$$

with the rest of the circuit as before. This embodiment depends on the fact that outputs of the arbiter will not switch when the second input (losing input) to the arbiter is asserted.

Using a Killable Arbiter in the Safe Synchronizer

Figure 6:
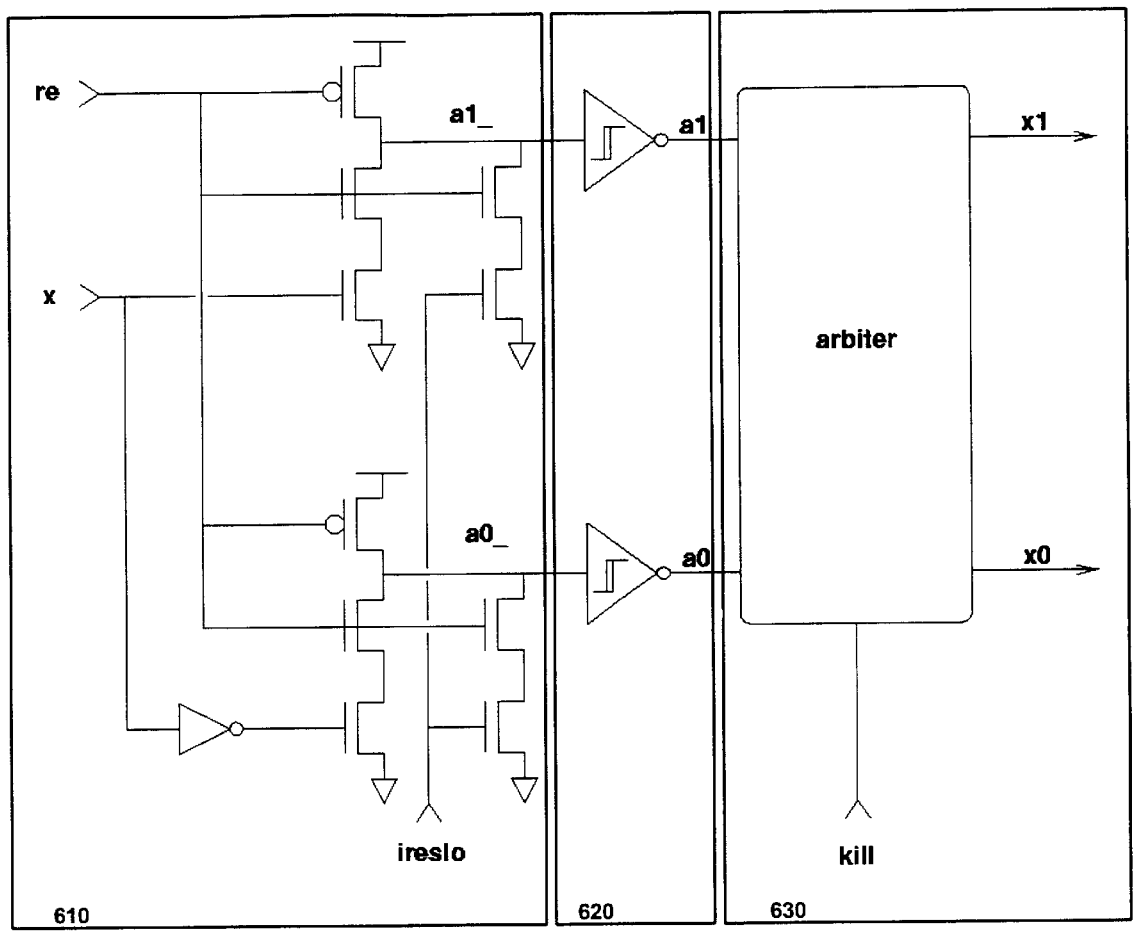
FIG. 6 is a circuit diagram of a synchronizer with a killable arbiter according to one embodiment of the present invention.

FIG. 6 shows the partial circuit diagram of another embodiment of the present invention. This safe synchronizer embodiment employs a killable arbiter in place of the SEL component in its circuitry. It has four components—input integrator 610, inverting component 620, killable arbiter 630, and a output filter, which is not shown. The killable arbiter allows resetting the inputs concurrently as long as a special kill signal is enabled. This embodiment requires more complex control than other embodiments. However, its main advantage is that both the winning and losing inputs are pulled up equally with the arbiter completely disabled (killed). There is no longer a need to analyze the situation when two inputs to the arbiter are asserted specially.

Two additional signals are needed to implement the killable arbiter in the circuit. The circuitry necessary to generate the ireslo and kill signals and to make the circuit obey the same I/O specification as the other embodiments is specified by the following HSE:

$$*[[[x0 \vee x1]; ireslo\uparrow; [a0 \wedge a1]; kill\uparrow; [x0 \to r0\uparrow \square x1 \to r1\uparrow]; \qquad (22)$$

$$[\neg a0 \wedge \neg a1]; kill\downarrow; [\neg x1 \wedge \neg x0]; ireslo\downarrow; r0\downarrow; r1\downarrow]$$

The translation to PRS for this HSE is straightforward. The PRS of this HSE results in four Muller C-elements and an OR-gate. As shown in FIG. 6, an advantage of this embodiment is that C-elements are not required.

Figure 7:
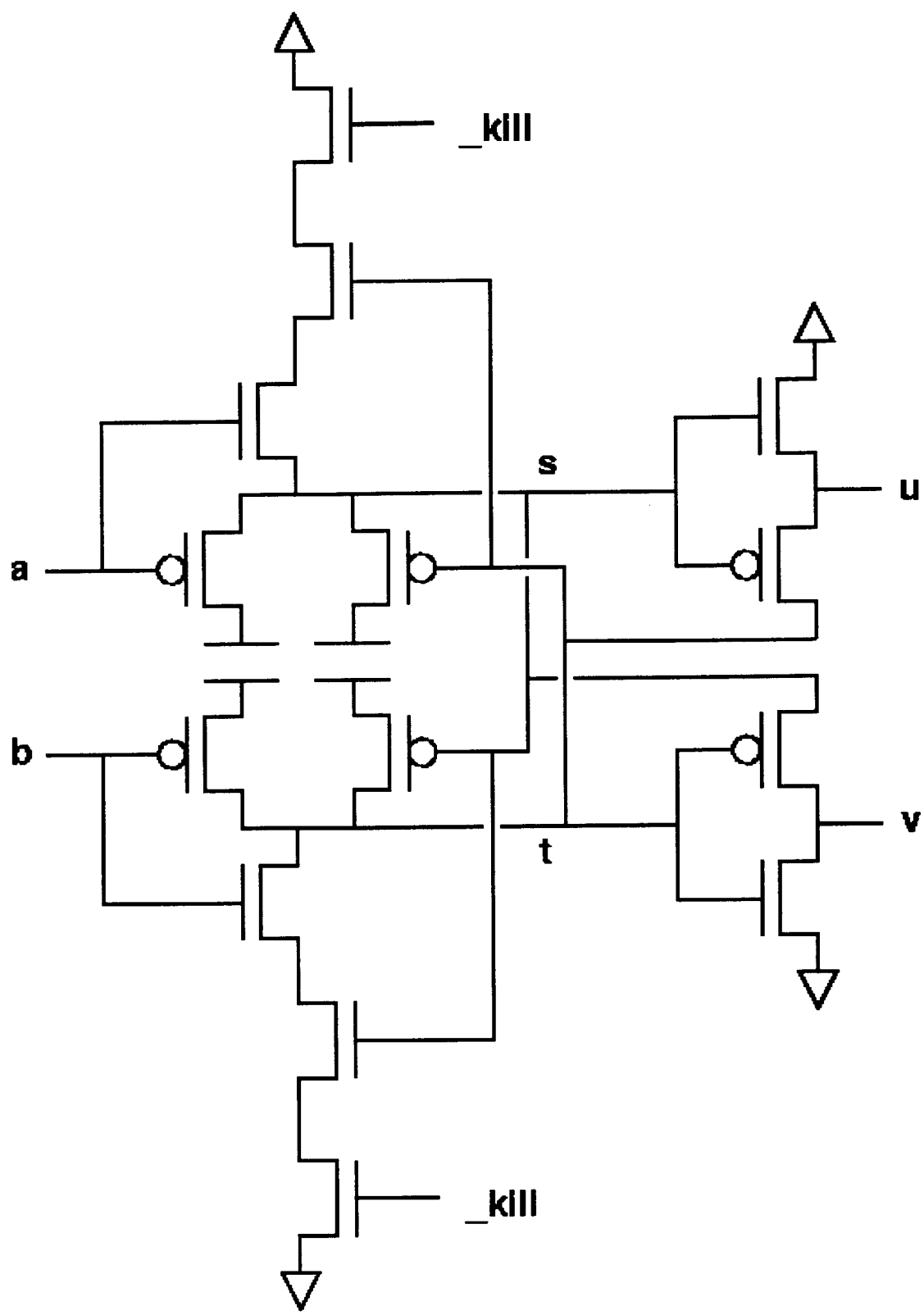
FIG. 7 is a circuit diagram of a killable arbiter according to one embodiment of the present invention.

The circuit diagram of the killable arbiter 620 is shown in FIG. 7. When _kill is low, the arbiter cannot drive any of its output to high, and the inputs to the arbiter may reset in any order. The outputs will reset first when the kill signal is de-asserted.

Synchronizer Operation

FIG. 8A shows the operation of one embodiment of the present invention. In box 811, both the input signal and the control signal are received in the synchronizer. Then an input integrator integrates them into two internal variables in box 812, with one signifying that the input signal was observed to be false and another signifying that the input signal was to be true. The SEL component then arbitrates between these two internal variables in box 813. It may go into a metastable state at this point. Then it outputs to a dual-rail output in box 814 through the output filter circuit. In box 815, all values are reset.

FIG. 8B shows the operation of another embodiment of the present invention. In box 821, both the input signal and the control are received in the synchronizer. Then an input integrator integrates them into two internal variables in box 822, with one signifying that the input signal was observed to be false and another signifying that the input signal was observed to be true. The synchronizer then arbitrates between these two internal variables in box 823. It may go into a metastable state at this point. In box 824, the losing internal value is also brought high so both values are at true. Then it outputs to a dual-rail output in box 825 through the output filter circuit. In box 826, all values are reset.

Figure 8C:
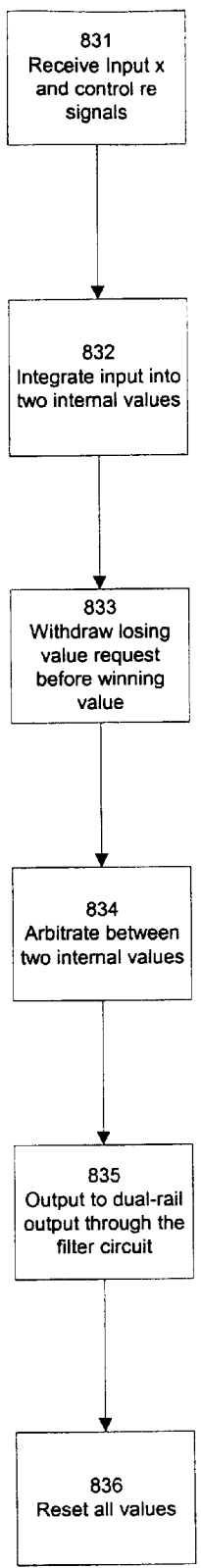
FIG. 8C shows the operation of one embodiment of the present invention.

FIG. 8C shows the operation of another embodiment of the present invention. In box 831, both the input signal and the control signal are received in the synchronizer. Then an input integrator integrates them into two internal variables in box 832, with one signifying that the input signal was observed to be false and another signifying that the input signal was observed to be true. In box 833, the losing value is withdrawn before the winning value. The embodiment that uses a standard arbiter to arbitrate between these two internal variables in box 834. It may go into a metastable state at this point. Then it outputs to a dual-rail output in box 835 through the output filter circuit. In box 836, all values are reset.

Figure 8D:
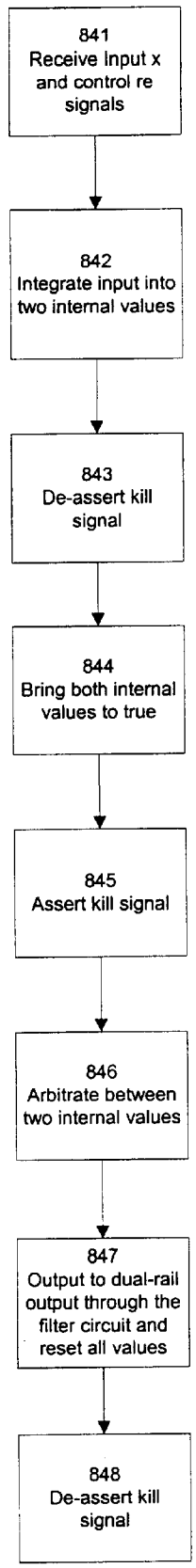
FIG. 8D shows the operation of one embodiment of the present invention.

FIG. 8D shows the operation of an embodiment of the present invention that uses a killable arbiter. In box 841, both the input signal and the control signal are received in the synchronizer. Then an input integrator integrates them into two internal variables in box 842, with one signifying that the input signal was observed to be false and another signifying that the input signal was observed to be true. Then the kill signal that is sent to the arbiter is de-asserted in box 843. In box 844, both the internal values are set to true. In box 845, the kill is asserted (i.e. it is sent to the arbiter). Then the killable arbiter arbitrates between these two internal variables in box 846. It may go into a metastable state at this point. In box 847, the synchronizer outputs to a dual-rail output and resets concurrently all values in the circuit. In box 848 the kill signal is de-asserted.

Performance Measurements

Performance testing was performed by simulating embodiments of the present invention. The layout was produced using Berkeley's Magic layout editor, using the design rules for the MOSIS/HP 0.6 $\mu$m process. The layout was simulated using the Aspice analog simulator with BSIM2 parameters. The parameters used are known to over-state circuit performance by some 15–20%, and the fact that the simulated layout did not include wiring loads would result in a further performance loss of about the same magnitude in a real implementation.

Two embodiments of the present invention were connected to a simple process that repeatedly requested values. The input signal was taken from an unsynchronized eleven-stage ring oscillator running at approximately 300 MHz. The interval between adjacent synchronizations was measured (this included any metastability due in inputs arriving within the confusion interval). The first embodiment tested was the fast synchronizer. The second embodiment was the safe synchronizer with a killable arbiter. The results are summarized as follows:

| Implementation | Fast | Safe |
| --- | --- | --- |
| Mean cycle (ns) | 1.36 | 3.41 |
| Standard Deviation (ns) | 0.031 | 0.306 |

The large standard deviation of the synchronization interval of the safe synchronizer was due to the fact that sometimes, because of the rapidly changing input, a1 and a0 were both asserted before ireslo went high.

Performance improvements could be made to embodiments of the present invention. Particularly the safe synchronizer could be improved by rearranging the signal senses. Furthermore any synchronizer design could also be improved simply by interleaving between two or more identical synchronizers.

Figure 9:
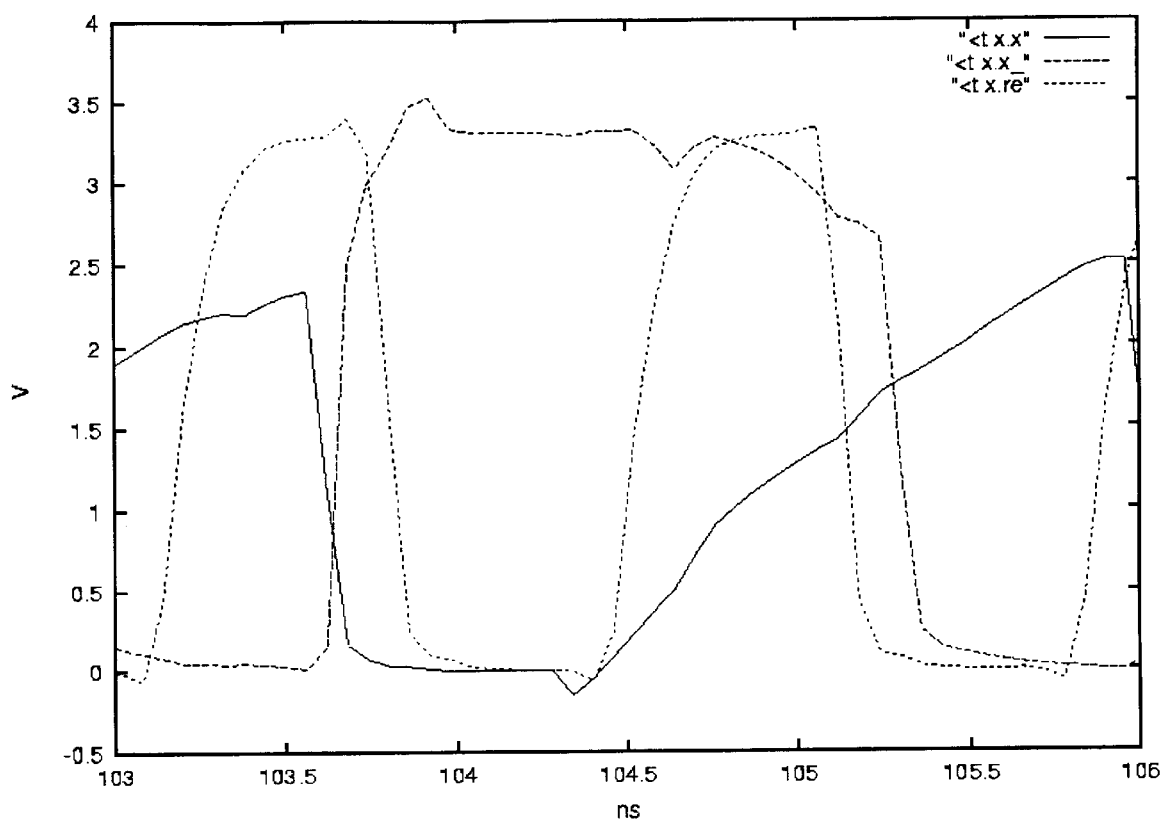
FIG. 9 is a result plot that shows the synchronizer inputs during performance testing.
Figure 10:
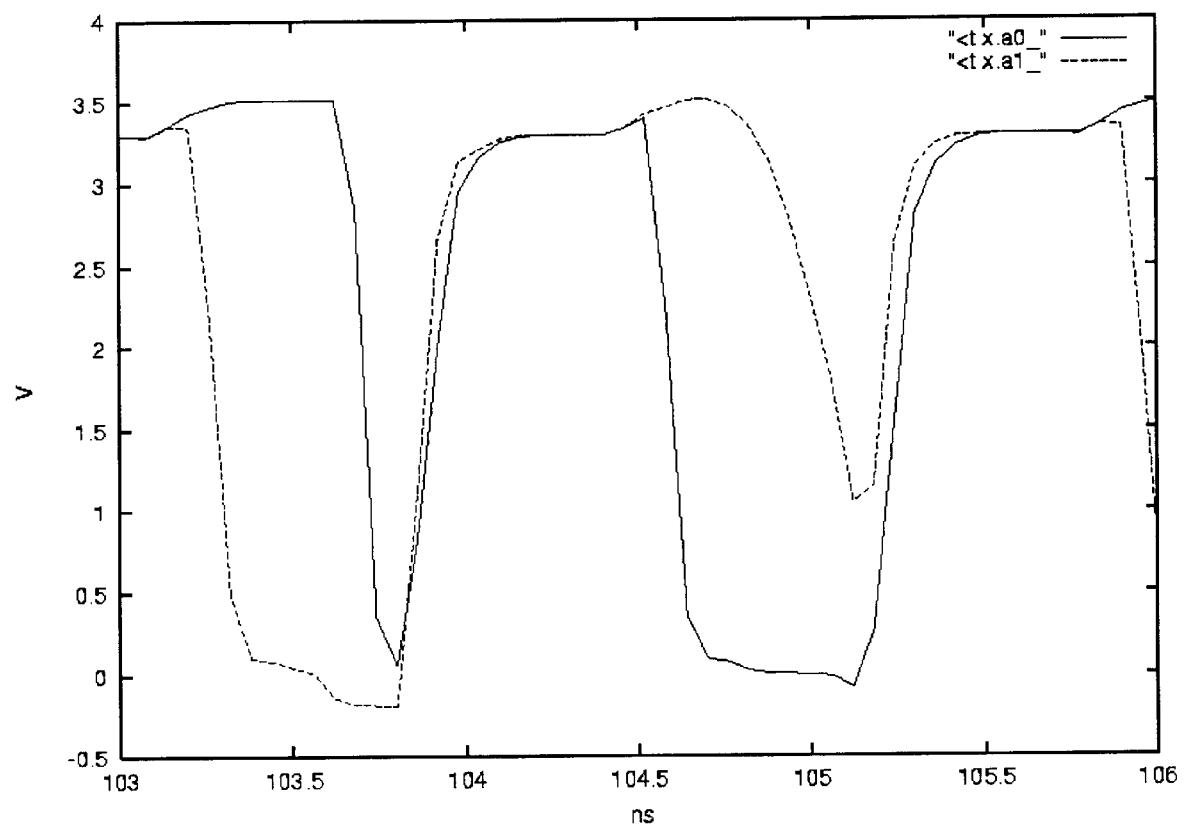
FIG. 10 is a result plot that shows the integrator outputs during performance testing.
Figure 11:
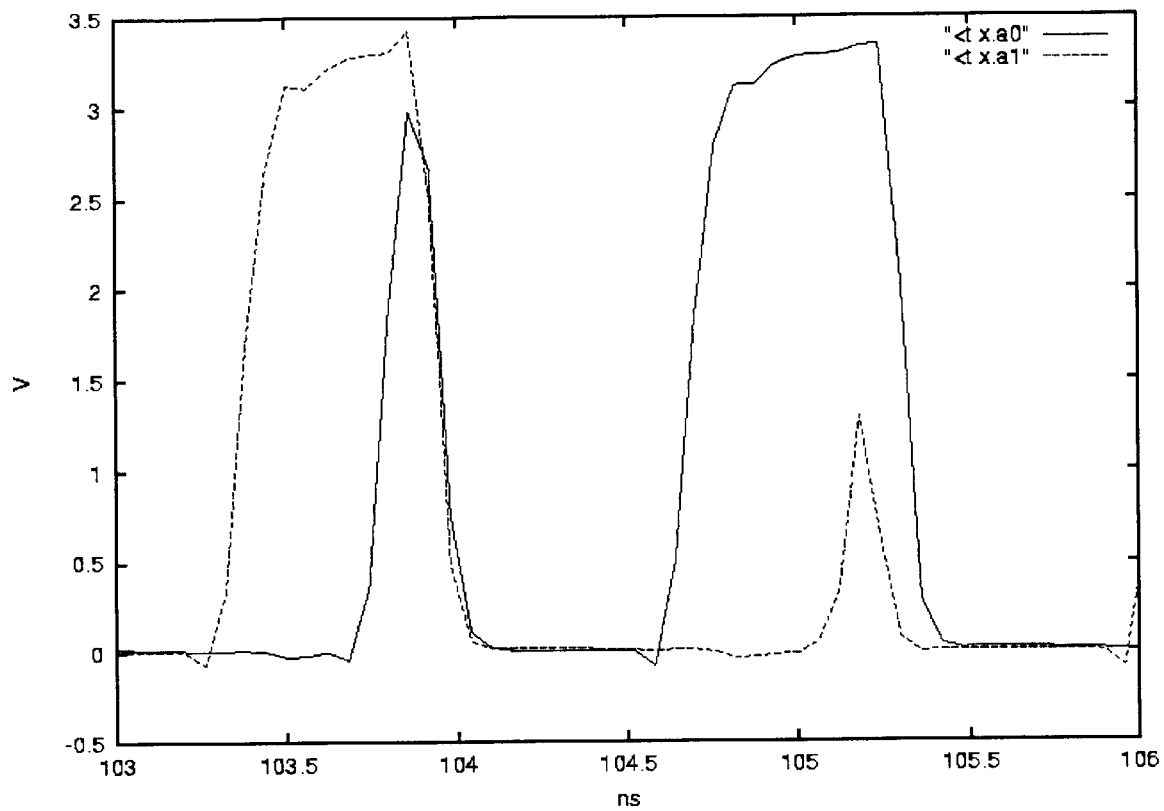
FIG. 11 is a result plot that shows the SEL inputs during performance testing.
Figure 12:
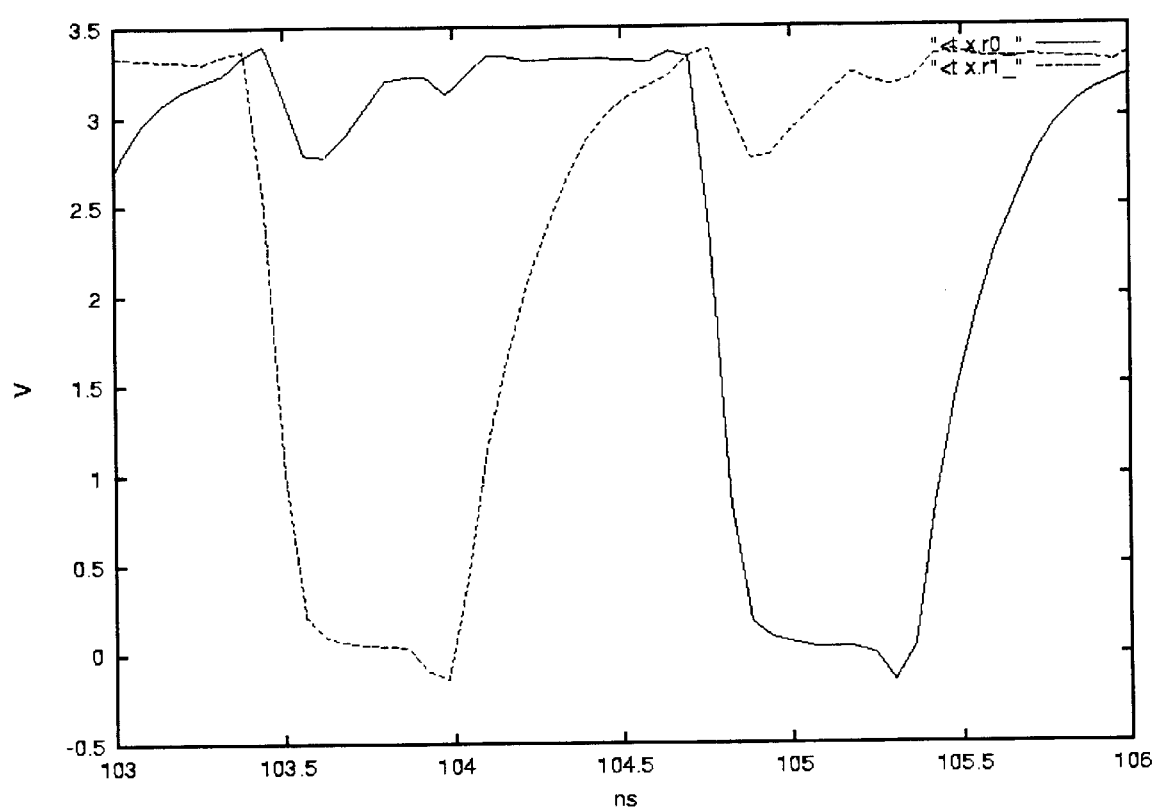
FIG. 12 is a result plot that shows the voltages of the internal nodes during performance testing.
Figure 13:
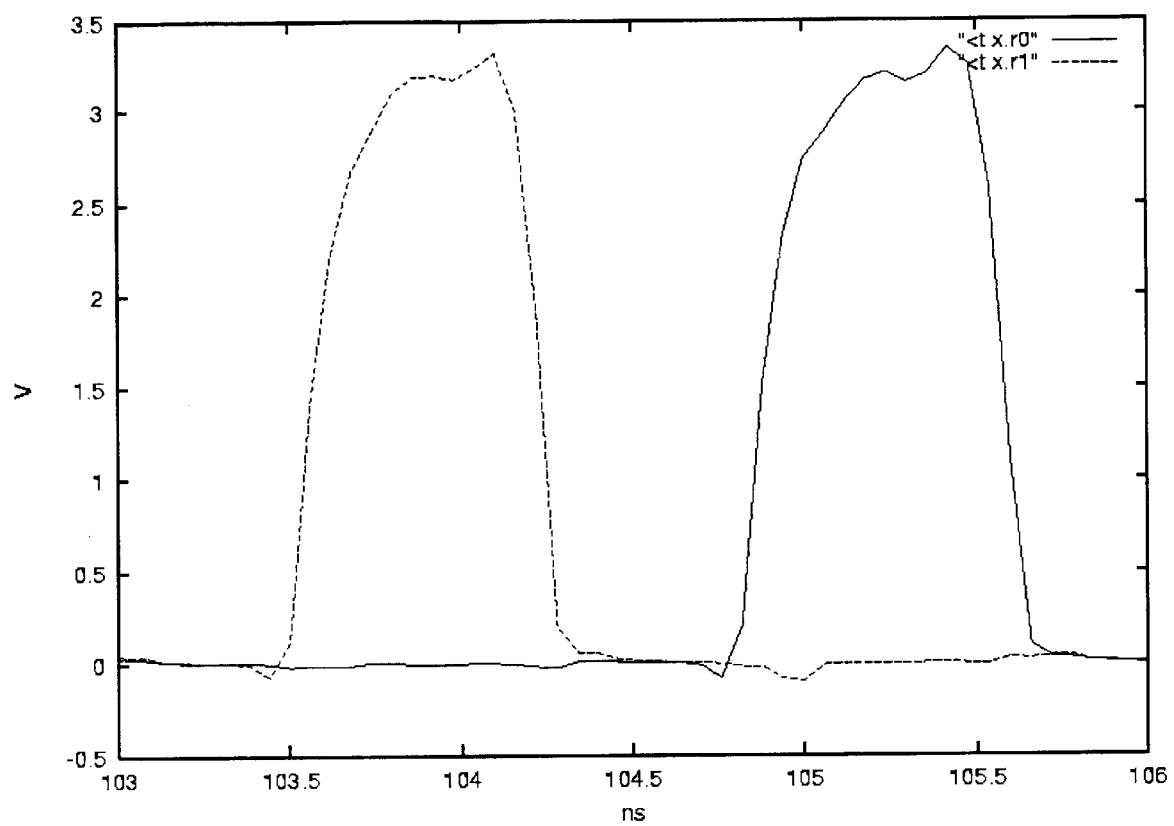
FIG. 13 is a result plot that shows the overall synchronizer outputs during performance testing.

FIGS. 9–13 show an example of two synchronizations performed by the simulated version of the fast synchronizer embodiment. FIG. 9 shows the inputs x, x_ and the request input re. FIG. 10 shows the outputs a0_ and a1_ of the input integrator. FIG. 11 shows the inputs a0 and a1 to SEL component. FIG. 12 shows the voltages of internal nodes r0_ and r1_ of the arbitration stage. Finally FIG. 13 shows the clean outputs r0 and r1 of the device.

CONCLUSION

Thus, a failure-free synchronizer is described in conjunction with one or more specific embodiments. The invention is defined by the claims and their full scope of equivalents.

What is claimed is:

1. A failure-free synchronizer comprising:

an input integrator;

an inverting component;

a SEL component capable of arbitrating signal that is withdrawn before being acknowledged; and an output filter whereby said input integrator receives an input signal and a control signal and sends a pair of internal signals through said inverting component to said SEL component whereby said SEL component arbitrates between said pair of internal signals to output, through said output filter, results indicating whether said input signal was true or false when said control signal was received.

2. The failure-free synchronizer of claim 1 wherein said input integrator further comprises:

a pair of input integrators which integrates both of said input value and said control signal and generates a first of said pair of internal signals and a second of said pair of internal signals wherein said first signal signifies said input value was true when said control signal was asserted and said second signal signifies said input value was false when said control signal was asserted.

3. The failure-free synchronizer of claim 2 wherein said inverting component further comprises:

inverters which invert said first and second internal signals and send them to said SEL component.

4. The failure-free synchronizer of claim 3 wherein said SEL component further comprises:

an arbitrator with digital circuitry which arbitrates between said first and second internal values to determine which of said internal values is a winning value and which of said internal values is a losing value and outputs a first final value signifying said input value was true or a second final internal value signifying said input value was false when said control signal was asserted.

5. The failure-free synchronizer of claim 4 wherein said SEL component pulls up both of said internal values to true before resetting.

6. The failure-free synchronizer of claim 4 wherein said SEL component comprises a standard arbiter and withdraws said losing value before arbitrating between said internal values.

7. The failure-free synchronizer of claim 4 wherein said SEL component comprises a killable arbiter whereby said killable arbiter is disabled and both of said internal values are pulled up to true.

8. The failure-free synchronizer of claim 3 wherein said inverting component comprises of Schmitt triggers.

9. The failure-free synchronizer of claim 2 wherein said synchronizer is QDI-compliant.

10. The failure-free synchronizer of claim 1 wherein said synchronizer operates with a metastable state and said output filter prevents said metastable state from affecting the circuit environment in which said synchronizer is implemented.

11. The failure-free synchronizer of claim 10 wherein said output filter further comprises:

a pair of C-elements which outputs said results to a dual-rail output.

12. A method for using a failure-free synchronizer comprising:

integrating a control signal and an input signal and generating a pair of internal signals;

inverting said internal signals;

using a SEL component comprising an arbitrator with digital circuitry to arbitrate between said internal signals, wherein said SEL component is capable of arbitrating signal that is withdrawn before being acknowledged;

outputting results indicating whether said input signal was true or false when said control signal was received through an output filter; and resetting all signals in said failure-free synchronizer.

13. The method of claim 12 wherein said receiving further comprises:

receiving said control signal and said input signal with an input integrator comprising a pair of input integrators;

using said pair of input integrators to integrate said input value and said control signal; and generating a first of said pair of internal signals and a second of said pair of internal signals wherein said first signal signifies said input value was true when said control signal was asserted and said second signal signifies said input value was false when said control signal was asserted.

14. The method of claim 13 wherein said using inverting further comprises:

using an inverting component comprises of inverters to invert said first and second internal signals.

15. The method of claim 14 wherein said using a SEL component further comprises:

using a SEL component comprising an arbitrator with digital circuitry to arbitrate between said first and second internal values to determine which of said internal values is a winning value and which of said internal values is a losing value and outputs a first final value signifying said input value was true or a second final internal value signifying said input value was false when said control signal was asserted.

16. The method of claim 15 wherein said SEL component pulls up both of said internal values to true before resetting.

17. The method of claim 15 wherein said SEL component comprises a standard arbiter and withdraws said losing value before arbitrating between said internal values.

18. The method of claim 15 wherein said SEL component comprises a killable arbiter whereby said killable arbiter is disabled and both of said internal values are pulled up to true.

19. The method of claim 15 wherein said inverting component comprises of Schmitt triggers.

20. The method of claim 12 wherein said synchronizer operates with a metastable state and said output filter prevents said metastable state from affecting the circuit environment in which said synchronizer is implemented.

21. The method of claim 20 wherein said outputting further comprises:

using an output filter which comprises of a pair of C-elements which outputs said results to a dual-rail output.

22. The method of claim 12 wherein said synchronizer is QDI-compliant.

23. The method of claim 12 wherein a plurality of said synchronizers are interleaved.

* * * * *